United States Patent Office 2,998,375
Patented Aug. 29, 1961

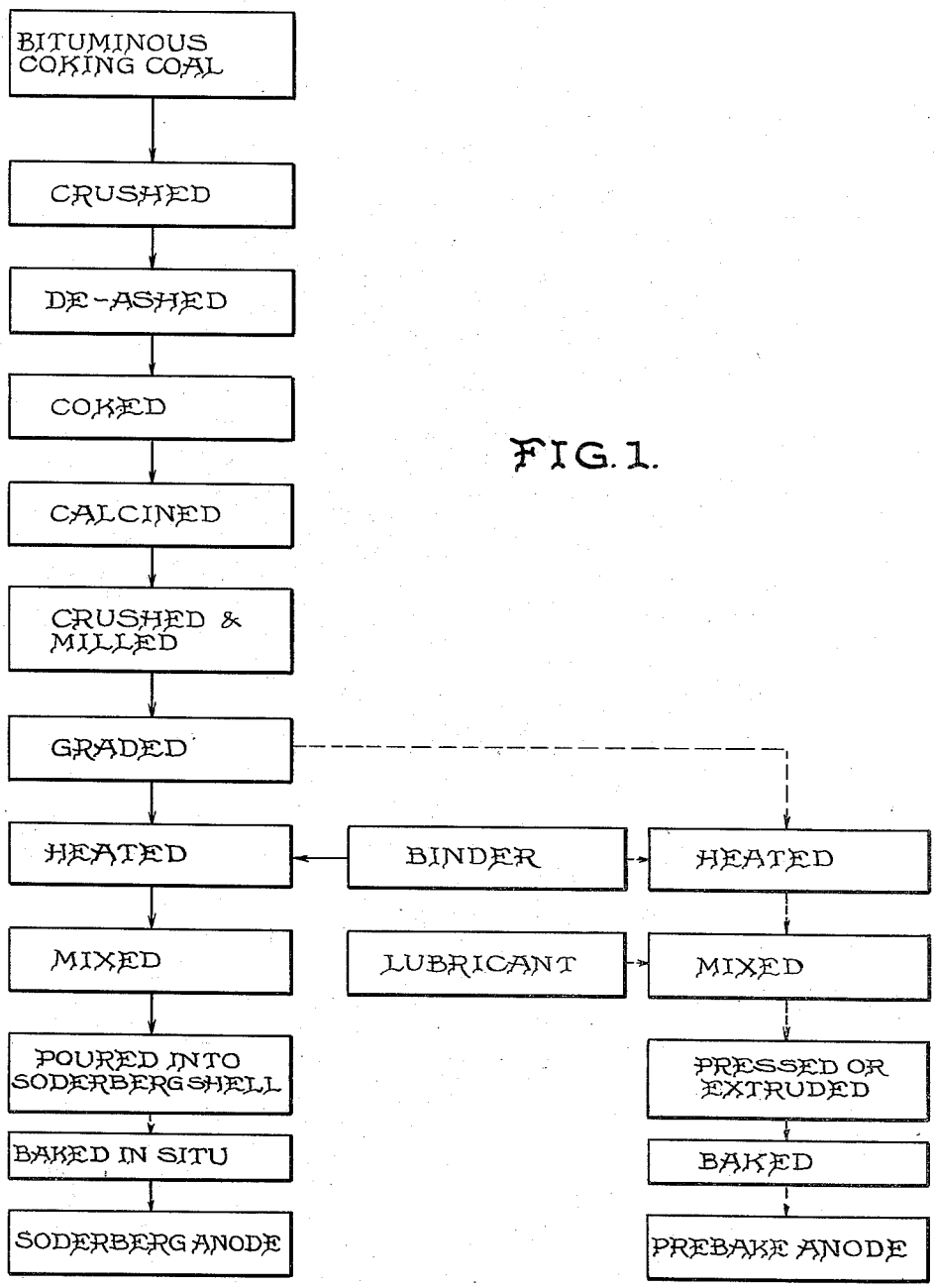

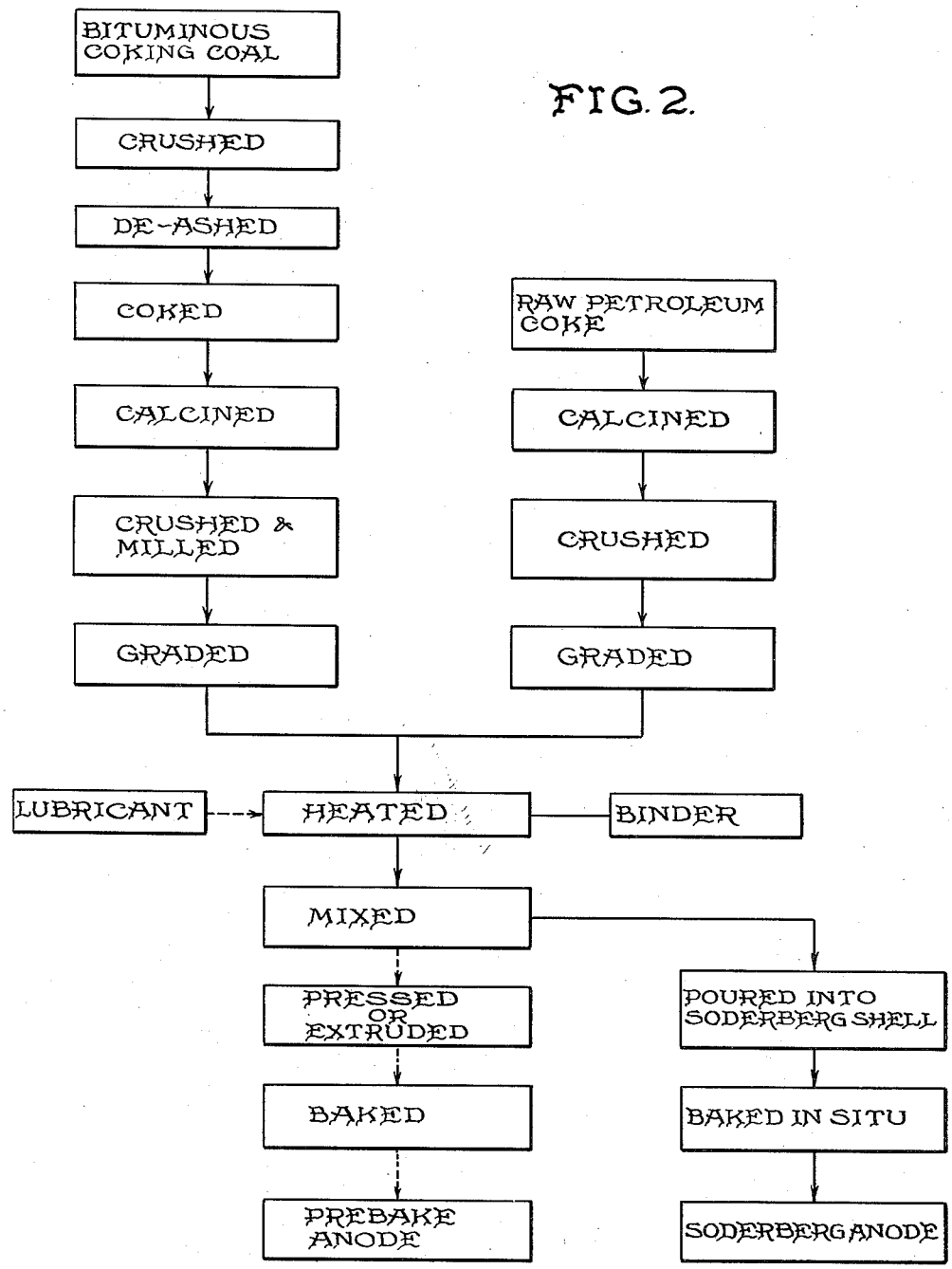

2,998,375
ELECTRODE OF CARBON MATERIAL FROM BI-
TUMINOUS COAL AND METHOD OF MAKING
THE SAME
Warren S. Peterson and Donald H. Thompson, Spokane,
Wash., assignors to Kaiser Aluminum & Chemical Cor-
poration, Oakland, Calif., a corporation of Delaware
Filed Jan. 6, 1953, Ser. No. 329,792
7 Claims. (Cl. 204—294)

The present invention relates to carbon bodies. In particular, the present invention relates to new, novel carbon compositions and electrodes, anodes or cathodes, and methods or processes for making the same.

Carbon electrodes, such as those commonly used in the electrolytic process of producing aluminum, are made from suitable proportions of crushed carbon in the form of coke mixed with a binding agent such as coal tar pitch. The crushed coke and binder, or paste, are heated and mixed, either molded under pressure and then calcined to a high temperature to eliminate all volatile matter, carbonize the binder, and produce a hard, rugged electrode as in the case of prebake electrodes or the crushed coke and binder are heated and mixed and then baked, in situ, in the form of a Soderberg electrode. Because of the essential requirement of purity of the electrode material, petroleum coke is particularly adapted for electrode manufacture. It has a low ash content, is high in fixed carbon, and has the necessary strength and hardness. In the United States, anodes for the aluminum production process are made from petroleum coke almost exclusively. However, as has been experienced in the past, petroleum coke often becomes scarce and is considerably higher in price than coal coke. In the reduction of aluminum, approximately 0.6 pound of anode carbon is consumed per pound of aluminum produced. Obviously then, the cost of this commodity is an appreciable fraction of aluminum production costs. Moreover, demand for petroleum coke has increased due to increased aluminum production facilities being installed, leading to a tight supply situation.

The use of anthracite coal as a material in the production of electrodes necessitates extensive crushing and cleaning operations since anthracite coal is high in ash which adversely affects the purity of the aluminum produced. Anthracite is located chiefly in the Northeastern region of the United States, a considerable distance removed from a majority of the aluminum reduction plants. The electrical resistivity of calcined anthracite is high requiring calcination at extremely elevated temperatures in order to reduce it to a useful value. For example, when calcined at 1425° C., its specific resistivity is about .0046 ohm/in./in.$^2$. To obtain a resistivity of practical value, i.e., about 0.0026 ohm/in./in.$^2$, it is necessary to heat the calcined anthracite at elevated temperatures. Also, due to its hardness, considerable time and labor must be expended in preparing it for use.

In the case of Soderberg anodes, due to the fact that the aggregate contains a large proportion of particles in the small particle sizes, the problem attendant with the use of the hard petroleum coke and anthracite is intensified by the cost of the labor and machinery necessarily expended in crushing or pulverizing such material to the required sizes to make the proper size consist. This problem is not avoided in the manufacture of prebake anodes for these also employ a considerable amount of particles in the smaller sizes.

On the other hand, bituminous coal is widely distributed throughout the United States and costs considerably less than petroleum coke and anthracite coal. Although coal coke should be favorably considered as a source of carbon for electrodes for the aluminum industry due to its cheapness, it has not heretofore been employed successfully in the manufacture of electrodes, probably due to the strict requirements of industry with regard to purity, density, electrical resistivity and strength. For example, electrodes from bituminous coals, as formerly made, had considerably higher electrical resistivities, lower densities and lower strengths than those made from petroleum cokes, making them unsuitable for employment as electrodes and especially as anodes in aluminum reduction processes. It would be highly desirable, therefore, if satisfactory electrodes could be produced from bituminous coal which is abundant and cheap, and, accordingly, it is an important object of the present invention to provide a method for the successful production of useful electrodes, particularly those useful in aluminum reduction processes, utilizing bituminous coals as a source of material.

It is another object of the present invention to provide a method for making electrode compositions utilizing as a source material bituminous coals.

It is yet another object of the present invention to provide a method for preparing bituminous coals so that they may be successfully employed in the manufacture of electrodes for use in aluminum reduction processes.

Still another object of the present invention is to provide compositions of matter which are useful in the preparation of electrodes.

A further object of the present invention is to provide new carbon containing articles useful as electrodes in aluminum reduction processes.

A still further object of the present invention is to provide graphitized electrodes from bituminous coal materials.

These and other objects and advantages of the present invention will become more apparent from the following detailed description, examples and drawing, wherein:

FIGURE 1 as a flow sheet of the process of the present invention; and

FIGURE 2 is a flow sheet of a modification thereof.

It has now been found that anodes or electrodes can be produced from bituminous coking coal and can be successfully employed as a replacement for petroleum coke anodes, particularly in the aluminum reduction process. This new anode has a density, resistivity, and strength comparable to the best anodes prepared from petroleum coke and better than anodes from bituminous coal as formerly made. It has been found that if bituminous coking coal is de-ashed, coked and calcined to relatively high temperatures while heating at moderate to rapid rate through the plastic zone, crushed and milled (or crushed, milled and then calcined), and utilized in an aggregate consist containing a relatively large amount of small particle sizes with the customary binder in the amount necessary to bind the particles during baking, it is possible to obtain a satisfactory electrode on subsequent baking. Further benefits can be realized if minor amounts of calcined petroleum coke and butt scrap are employed with the bituminous coal coke. This invention results in a considerable savings in labor and equipment employed in the manufacture of electrodes from petroleum coke and provides new, economical sources of suitable carbon for the production of the highly specialized electrodes or anodes employed in the aluminum industry.

In general, with reference to FIGURE 1 of the drawing, it will be seen that the method of the present invention comprises several steps all of which contribute toward the production of a suitable electrode composition or baked electrode. A good coking bituminous coal is selected and crushed to a size suitable for handling, de-ashed, and then coked to a temperature in excess of 700° C. After coking, this product, which should have certain properties as shown hereinafter, is then calcined to a temperature of at least about 1300° C., crushed and milled. During the coking step, the coal should be heated through the plastic zone at a moderate to fast rate. The step of calcination may be accomplished in any type of furnace, so long as it is done in a non-oxidizing atmosphere. It is to be noted, as mentioned hereinbefore, that the steps of calcining and then crushing and grinding may be reversed although it is preferable to first calcine and then crush and mill for reasons which will be given hereinafter. After crushing and milling, the coke is graded, made up into the proper aggregate, and then mixed with a binder and the paste mixture poured into the Soderberg anode shell where it is baked as it is fed toward the furnace. Moreover, the calcined bituminous coal coke in a slightly different size consist can be mixed with a binder, pressed (or extruded if a lubricant or plasticizer is added) and baked to form a prebake anode block. After insertion of the metal anode connector stub into the anode block, the prebake anode is placed in the aluminum reduction pot.

The bituminous coal employed should be of good coking quality, and having an amount of ash which, prior to coking, can be reduced by simple cleaning to not over 2.5% and preferably not over 0.5% by weight. The coal is first crushed to a size which can be easily handled, usually to pass a 0.371" mesh screen, and is cleaned and de-ashed. De-ashing may be accomplished by physical methods, e.g., sink-float separation using heavy media having a specific gravity of 1.25 to 1.35 depending on the coal, and/or treated by chemical methods, such as leaching with hydrofluoric acid solutions. Other organic and inorganic solutions well known in the art can likewise be used to clean and de-ash the coal.

After cleaning, the coal is coked in an atmosphere free of oxygen by heating at a moderate to rapid temperature rise through the plastic range (300 to 700° C.) and above. A fast rate of carbonization refers to a heating rate above 300° C. per hour in a 16" diameter Bureau of Mines, American Gas Assn., retort, while a moderate rate similarly refers to a heating rate of from 100 to 300° C. per hour. Slow carbonization can be used, but rates below 100° C./hr. in this retort are not desirable since these low rates are apt to produce chars, increase resistivities in the coke, and increase the costs of operation. Coking may take several hours or several days depending upon the type and size of furnace employed. The coked coal should have a specific resistivity (determined on a minus 20 plus 28 mesh fraction (Tyler standard screen scale) of not greater than about 0.0039 ohm/in./in.$^2$, a real density of about at least 1.75 g./cc. Density was determined by Bureau of Mines and ASTM methods using kerosene instead of water as a displacement fluid (Stanton et al., "Methods of Analyzing Coal and Coke," Bur. Mines TP8, 1938; and "Test for True Specific Gravity," D–167–24, ASTM Standards, 1946, part III–A, p. 87). Hardness was determined by a grindability test—a 20 gram sample of minus 28 plus 48 mesh material was charged to a rod mill and the mill rotated for 1 minute. The percentage of sample remaining on a 100 mesh screen was termed its hardness index. For temperatures from 900 to 970° C. specific resistivities of such cokes will range from about 0.0032 to 0.0039 ohm/in./in.$^2$, real densities of from about 1.75 to 1.85 grams per cc., and hardnesses of from about 35 to 60. The coked coal should also be in the form of a strong swollen cake, be dense and have a thick cell wall structure.

After coking, the bituminous coal coke is calcined using any suitable type of furnace under an inert or non-oxidizing atmosphere at a temperature in the range of from 1200–1500° C. and preferably about 1400° C. Below 1200° C., the properties of the calcined coke are not suitable for the production of good anodes due to high resistivity and low density. The calcined coke should exhibit a real density of at least about 1.90 grams/cc., a hardness index of not less than about 35, and a specific resistivity of not greater than about 0.0025 ohm/in./in.$^2$. Some graphitization or a degree of crystallinity as indicated by X-ray analysis may be found in the calcined coke.

The coke is next crushed and milled in a ball mill or other attrition milling equipment to increase the fines and spherulize them. Such milling also increases the apparent or bulk density of the particles, whereas bulk density of rotary calcined petroleum coke is practically independent of particle size. For example, after milling, the bulk density of one calcined coal coke for minus 28 plus 100 mesh particles was 0.66 gram/cc., whereas before milling it was 0.54 g./cc. For minus 48 plus 100 mesh patricles, the bulk density was 0.61 g./cc. before and 0.72 g./cc. after milling, and for minus 100 plus 200 mesh, the bulk density was 0.68 g./cc. before and 0.84 g./cc. after milling. The density of the minus 200 mesh material was not increased during this process. The average overall increase in density was about 20%.

With regard to the order of the process steps discussed above, it is to be noted that the crushing and milling steps may be accomplished after the coking step and prior to the step of calcination. However, usually it is preferable to crush the material after calcination because of the heat loss encountered by crushing the coked material. This heat must be re-supplied to the material for the calcination step. Too, difficulty may be experienced in the handling of fines if the material is crushed before calcining. However, it is contemplated, within the scope of the invention, that there may be instances; e.g., continuous operation, wherein the steps of crushing and milling may advantageously follow the coking step.

The calcined coal coke is then graded into various particle sizes required for an aggregate suitable for a Soderberg anode. When a pre-bake anode is to be made the consist should contain a small percent of larger particles not used for the Soderberg aggregates. Desirable size consists (Tyler standard screen scale) for a prebake anode are by weight: 8 to 8.5% minus 8 plus 28 mesh, 9.5 to 13% minus 28 plus 48 mesh, 17 to 23% minus 48 plus 100 mesh, 24 to 27% minus 100 plus 200 mesh, and balance minus 200 mesh. For a Soderberg anode the preferred aggregate consist is by weight about 33% minus 28 plus 100 mesh, about 26% minus 100 plus 200 mesh, and the balance minus 200 mesh.

Any suitable binder commonly used in the manufacture of carbon anodes can be used with the calcined coal coke herein described. Examples thereof are bitumens, asphalts, coal tar pitch, oil tar pitch, tars, resins, gilsonite, etc. The pitches, etc., may have been produced by distillation, cracking, solvent extraction, concentration and similar resin or tar producing processes. A preferred binder should have a melting point of from 40 to 175° C., which is suitable for easy mixing on heating with the carbon aggregate, and it should be readily carbonizable at baking temperatures, as well as graphitizable if elevated temperatures are to be employed, to form a plurality of bonds throughout the mass of the aggregate as well as fill the pores thereof (to some extent) to increase density. It is only necessary to use a minor amount of binder sufficient to enable thorough mixing and the necessary bonding action on carbonization. It has been found preferable for Soderberg mixes to use from about 20 to 35% by weight of binder, balance carbon aggregate and for prebake mixes from about 15 to 25% by weight binder, the balance being the carbon aggregate. When it is desired to extrude the mixture, rather than to press it, a lubricant may desirably be added to the composition in a minor amount sufficient to effect this purpose, usually only about 0.1 to 5 percent by weight are necessary. Such may be heavy lubricating oils, black oils or other similar materials which are carbonizable and enable the mass to be sufficiently plastic to be extruded.

The container in which the material is mixed may or may not be heated depending on the nature of the binding material. However, with coal tar pitch, a desirable binder, the mixture is heated to a temperature slightly above the softening point of the pitch to insure good coating of the aggregate particles. Depending on temperature of mixing and the amount of material, the time of mixing may vary from a few minutes to several hours.

At the conclusion of the mixing step the plastic paste is poured into the Soderberg anode shell, tamped, and permitted to gradually bake in situ as the anode is lowered to the pot at increasing temperatures to about 960° C. to form a hard dense mass. When the material is to be used in other than the Solderberg (continuous) process, i.e., such as to form prebake anodes, the mix with its proper proportion of binder can be extruded or charged to a press and hot pressed at a pressure of from 8000 to 10,000 p.s.i. for several minutes to form a shaped "green" anode. Lubricants may be added to the sides of the mold to aid in pressing. The pressed green anode is then packed in coke, graphite, carbon, or other suitable material and baked in an inert or non-oxidizing atmosphere to a temperature of about 900–1100° C., for a period of time sufficient to carbonize the binder and result in a strong, dense body. After baking, a conductive anode stub may be inserted into the hole usually provided in the top of the anode and molten cast iron poured therein around the stub to secure it to the anode and provide good electrical contact whereupon the assembly is ready for use in the aluminum reduction pot.

While the invention has been described as applicable to the manufacture of Soderberg compositions or anodes as well as prebakes by employing a highly calcined de-ashed coke from good coking bituminous coal, some improvement can be realized by replacing a portion of the coal coke in the larger mesh sizes with petroleum coke. It will be understood, of course, that the invention is primarily concerned with the production of anodes from coal coke and that the use of petroleum coke merely represents another embodiment of the basic concept. The addition of or replacement of the larger size consists of calcined coal coke by petroleum coke does not significantly change the specific resistivity of the Soderberg anode or of the prebake.

FIGURE 2 of the drawing shows a flow sheet illustrating the steps of the method utilized in producing a Soderberg or prebake anode employing mixtures of coal coke and petroleum coke. The steps are the same as those shown in FIG. 1 and discussed hereinbefore except that the petroleum coke is calcined, crushed, graded and then added in proper size consists to the calcined coal coke and binder which are then mixed, and the resulting paste pressed or poured, and baked to form a strong, dense anode. If desirable, the green anode can be graphitized.

In preparing the paste, butt fractions or green scrap may be used to partially or entirely replace the petroleum coke. These additions can be from calcined coal coke, calcined petroleum coke, or mixtures thereof prepared according to the present invention.

The calcined petroleum coke used in the mixtures described herein should not contain more than about 0.5% volatile matter. Imperial (Alberta, Canada), and Collier (California) petroleum cokes have been found very satisfactory in the practice of the present invention. Knowles coke can also be used in the process. This particular coke is usually obtained from petroleum fuel oils in the Curran-Knowles type of coke oven. It is a high temperature coke with low volatile content but with a density lower than that of rotary calcined petroleum coke.

The petroleum coke may be rotary calcined to a temperature of at least 1200° C. and preferably to a temperature of about 1400° C. After calcination, it should exhibit a real density of about 2.0 to 2.1 grams/cc., a hardness of from 60 to 80, a specific resistivity of from .0018 to .0015 ohm/in./in.$^2$ and a moderate degree of graphitization. These properties were determined by methods previously discussed.

The calcined petroleum coke is crushed to a size of about 28 mesh. Although this material may be crushed to smaller sizes, this procedure not only increases costs but does not materially decrease the specific resistivity of the coal coke-petroleum coke anode. Further, relatively massive particles of the petroleum coke have been found desirable since they provide good locking, cementation, and keying during pressing and baking and thereby contribute to the strength of the final anode. The petroleum coke is crushed only enough to fill the larger particle size portions of the coke aggregate mixture.

It will be understood that the methods disclosed herein and the compositions and articles produced thereby are not intended to be limited merely to the use thereof for making anodes for the aluminum reduction processes but rather the compositions, articles and mehods herein disclosed can be used to produce other useful materials, for example, brushes for motors, graphite, and so forth. Still other uses will readily suggest themselves to those skilled in the art. Moreover, the electrodes (anodes or cathodes) of the present process are not limited solely to use as anodes in the aluminum reduction process, but can be used in electrothermal processes as well as in some electrolytic processes.

Anodes prepared according to this invention will exhibit specific resistivities varying from 0.0025 to 0.0030 ohm/in./in.$^2$ and apparent densities of from 1.39 to 1.53 g./cc. which are comparable to the best petroleum coke anodes showing specific resistivity of 0.0023 to 0.0026 ohm/in./in.$^2$ and apparent densities of from 1.55 to 1.58 g./cc. Anodes made exclusively from the best calcined coal coke have exhibited specific resistivities of from 0.0025 to 0.0030 ohm/in./in.$^2$ and apparent densities of from 1.39 to 1.48 g./cc. while those containing additions of calcined petroleum coke have shown specific resistivities as low as 0.0025 ohm/in./in.$^2$ and apparent densities of from 1.42 to 1.53 g./cc. These properties are more than ample to permit the practical use of the products of the present invention in the manufacture of aluminum.

The following examples will serve to illustrate the invention with more particularity to those skilled in the art.

EXAMPLE I

A medium volatile, good coking bituminous coal from the Michel B seam, Natal, B.C., Canada, was crushed to a size useful for coking and prior to coking was de-ashed in a solution containing carbon tetrachloride and naphtha at a specific gravity of 1.30. After immersion in this solution the float separated and dried, the coal was then treated with a 5% hydrofluoric acid solution, washed, and dried. The cleaned coal had a residual ash content of 0.5% by weight. It was then coked at a temperature of 900° C. The rate at which the coal was passed through the plastic zone was about 200° C. per hour in a 16" BM-AGA retort. After coking, the material was calcined to a temperature of 1400° C. in a non-oxidizing atmosphere and then crushed and ball milled. The calcined coke was next screened into various mesh sizes for the preparation of the desired aggregate using eight inch standard Tyler sieves on a Rotap shaking table. The aggregate size consist comprised, by weight about 8.5% minus 8 plus 28 mesh, 9.5% minus 28 plus 48 mesh, 17% minus 48 plus 100 mesh, 24% minus 100 plus 200 mesh, and 41% minus 200 mesh, which is suitable for Soderberg operation. 5000 grams of the aggregate were heated to 140° C. in a Baker-Perkins laboratory mixer and about 1400 grams of hard tar pitch (M.P. 112° C.) at the same temperature was added thereto. After 30 minutes mixing at 140° C. the paste was rammed into a preheated (120° C.) 5 inch I.D. steel mold with a light film of oil on the inner surface of the mold for lubrication. The paste was pressed in a Rodgers 60 ton hydraulic press to about 8000 p.s.i. and held for one minute at this pressure and then pushed from the mold. The five inch diameter green block, about 12 inches long, was heated at 1000° C. in a non-oxidizing atmosphere using a production bake-out cycle of about 4 days. After baking, the cooled anode was tested and found to have a specific resistivity of 0.0028 ohm/in./in.$^2$, and an apparent density of about 1.43 g./cc.

An anode composition was also prepared in the same manner as indicated in the foregoing except that only petroleum coke (Collier) calcined at 1400° C. was used having a size consist the same as the coal coke consist. It exhibited a specific resistivity of 0.0024 ohm/in./in.$^2$ and an apparent density of 1.55 g./cc. These tests thus indicate that the calcined coal coke composition provided anodes comparable to those from the petroleum coke composition.

Additional Soderberg compositions were prepared according to the method of Example I, using 100% calcined coal coke and mixtures of calcined coal coke and calcined petroleum coke. The aggregate used consisted of by weight 0.5% minus 4 plus 8 mesh, 3% minus 8 plus 14 mesh, 5% minus 14 plus 28 mesh, 9.5% minus 28 plus 48 mesh, 17% minus 48 plus 100 mesh, 24% minus 100 plus 200 mesh, and 41% minus 200 mesh. The results are indicated in Table A.

Table A

PROPERTIES OF TEST ANODES MADE FROM COAL COKE-PETROLEUM COKE MIXTURES

| | Test No. | | | |
|---|---|---|---|---|
| | 1 | 2 | 3 | 4 |
| Coke Used: | | | | |
| Michel B Coke—percent by wt.[1] | 100 | 82 | 65 | 41 |
| Petroleum Coke—percent by wt.[2] | 0 | 18 | 35 | 59 |
| Coal Coke—rate of coking thru plastic range | Fast | Fast | Fast | Fast |
| Coal Coke—Size Consist Tyler Screen Mesh | −4 | −48 | −100 | −200 |
| Petroleum Coke—Size Consist Tyler Screen Mesh | | −4+48 | −4+100 | −4+200 |
| Total percent Coal Coke and Petroleum Coke in paste mix | 76 | 79 | 80 | 81 |
| Pitch (By wt.) in Paste Mix—percent | 24 | 21 | 20 | 19 |
| Anode Properties: | | | | |
| Apparent Density g./cc. | 1.48 | 1.48 | 1.48 | 1.50 |
| Specific resistivity, ohm/in./in.$^2$ | 0.0030 | 0.0027 | 0.0029 | 0.0030 |

[1] Michel B coke, coal de-ashed to 0.5%, coked at 900°C., calcined at 1400° C.
[2] Collier petroleum coke calcined at 1400° C.

EXAMPLE II

A prebake anode was prepared according to the method disclosed in Example I, supra, except that it contained 23% pitch and the coal coke was crushed and ball milled and screened into the following sizes: by weight, 16.7% minus 28 plus 48 mesh, 16.7% minus 48 plus 100 mesh, 25.7% minus 100 plus 200 mesh and 40.7% minus 200 mesh. After carbonization at 1300° C. the prebake anode showed on testing a specific resistivity of .0029 ohm/in./in.$^2$ and an apparent density of 1.39 g./cc. A calcined petroleum coke anode prepared from a coke aggregate having a size consist of by weight, 2% minus 0.371" plus 4, 8% minus 4 plus 8, 18% minus 8 plus 14, 18% minus 14 plus 28, 9% minus 28 plus 48, 9% minus 48 plus 100, 14% minus 100 plus 200, and 22% minus 200 mesh, and said aggregate mixed with 17% pitch by weight, exhibited a specific resistivity of 0.0026 ohm/in./in.$^2$ and an apparent density of 1.50 g./cc. On the other hand, wholly coal coke compositions containing coal coke calcined from 900° C. to below 1300° C., but otherwise prepared under the same conditions in the same size consist as the petroleum coke revealed specific resistivities of from .0037 to .0049 and from .0042 to .0045 ohm/in./in.$^2$ and apparent densities of from 1.19 to 1.30 and from 1.15 to 1.16 g./cc., respectively.

This shows that aggregates from coal cokes should preferably be made of smaller particle sizes than those from petroleum cokes.

Still other anode compositions were prepared using calcined (1400° C.) petroleum coke and calcined (1300–1400° C.) bituminous coal coke from coal coked to 900° C. with a coal pitch binder (18% by weight) added to the aggregate *. The anodes 5" diameter by 12"

\* The aggregate consisted of: by weight, 2% minus 0.371" plus 4 mesh, 8% minus 4 plus 8 mesh, 18% minus 8 plus 14 mesh, 18% minus 14 plus 28 mesh, 9% minus 28 plus 48 mesh, 9% minus 48 plus 100 mesh, 14% minus 100 plus 200 mesh, and 22% minus 200 mesh.

long were obtained by pressing at 8,000 p.s.i. The apparent densities and specific resistivities of the resulting baked (900° C.) anodes are shown in Table B below:

Table B
PROPERTIES OF TEST ANODES FROM COAL COKE-PETROLEUM COKE MIXTURES

| Test No. | Calcined Coal Coke | | Calcined Petroleum Coke | | Coking Rate, °C./hr.[5] | Anode Properties | |
|---|---|---|---|---|---|---|---|
| | Size Consist | Percent by wt.[3] | Size Consist | Percent by wt.[4] | | Apparent Density, g./cc. | Specific Resistivity, ohm/in./in.[2] |
| 10 | −28 | 54 | −0.371″+28 | 46 | 410 | 1.42 | .0029 |
| 11 | −28 | 54 | −0.371″+28 | 46 | 125 | 1.45 | .0029 |
| 12 | −28 | 54 | −0.371″+28 | 46 | 390 | 1.48 | .0026 |
| 13 | −28 | 54 | −0.371″+28 | 46 | 360 | 1.48 | .0025 |
| 14[1] | −28 | 54 | −0.371″+28 | 46 | 360 | 1.46 | .0027 |
| 15[2] | −28 | 54 | −0.371″+28 | 46 | 250 | 1.42 | .0028 |
| 16 | −100 | 36 | −0.371″+100 | 64 | 390 | 1.49 | .0029 |
| 17 | −100 | 36 | −0.371″+100 | 64 | 125 | 1.52 | .0027 |
| 18 | −100 | 36 | −0.371″+100 | 64 | 125 | 1.53 | .0026 |
| 19 | −100 | 36 | −0.371″+100 | 64 | 410 | 1.49 | .0026 |
| 20 | −28 | 54 | −0.371″+28 | 46 | below 100 | 1.46 | .0028 |
| 21 | −100 | 36 | −0.371″+100 | 64 | below 100 | 1.47 | .0029 |
| 22 | | | −0.371″ | 100 | | 1.54 | .0024 |
| 23[6] | | | −0.371″ | 100 | | 1.56 | .0024 |

[1] 19% pitch.
[2] Hasler Creek coke, Pine River Area, B.C., Canada.
[3] Michel B coke, Natal, B.C., Canada.
[4] Collier petroleum coke.
[5] Average rate of heating through the plastic range.
[6] 17% pitch.

The above examples illustrate the fact that Soderberg aggregates made from good coking bituminous coal coke which has been de-ashed, calcined, crushed and milled will produce results comparable to petroleum coke anodes of approximately the same aggregate consist. Moreover, calcined bituminous coal coke prebake anodes can also be prepared, using aggregates comprised of somewhat smaller size particles or using aggregates in which the larger mesh sizes are of petroleum coke and the smaller mesh sizes of coal coke, which are comparable to petroleum coke prebake anodes. The need for calcining the coal coke at the higher temperatures has also been shown and as well as the use of the smaller size particles resulting from milling. These results thus show that bituminous coal coke can be treated in such a manner as to enable it to be utilized as an anode material. It should be noted that a rapid rate of carbonization through the plastic zone of coal is desirable although not as critical as heretofore believed. Contrary to expectations, the addition of petroleum coke to the Soderberg aggregate in place of the coal coke did not appreciably improve the properties of the resulting anode nor did the use of more petroleum coke in place of coal coke in the proper sizes appreciably lower the specific resistivity obtained.

In summary, the present invention teaches that it is now possible to produce new and novel Soderberg as well as prebake anodes from bituminous coal which are useful in the aluminum industry and characterized by having electrical and mechanical properties comparable to anodes made wholly of petroleum cokes. Such novel results have been obtained by discovering that coal coke from certain selected coals can be prepared in a novel manner for successful utilization in the production of anodes or electrodes. Accordingly, considerable savings are realized in the cost of anode materials and also in the cost of aluminum produced. The present invention also results in the elimination of, or reliance of the aluminum industry on, one source of anode material. Further, the process disclosed herein renders it unnecessary to now grind the harder petroleum coke in the smaller sizes needed for the proper aggregate thereby reducing processing costs, as more easily ground coal cokes can be employed resulting in, after baking, anodes having excellent properties. This invention, hence, provides industry, in particular the aluminum industry, with a long sought after, much needed tool to increase the efficiency of its processes.

Having thus described the invention, what is claimed as new and novel and is to be secured by Letters Patent is:

1. A method of producing electrode carbon material from bituminous coal, which comprises de-ashing a bituminous coking coal to an ash content below about 2.5% by weight, coking said coal to a temperature in excess of 700° C. with a rate of temperature rise through the plastic zone of not less than about 100° C. per hour to obtain a dense coke in the form of a strong swollen cake, calcining said coal coke at a temperature of from 1200 to 1500° C. to obtain a calcined coke having a specific resistivity of not greater than about 0.0025 ohm/in./in.$^2$, a real density of at least about 1.90 g./cc., and a hardness index of not less than 35, crushing and milling said coke and grading the coke particles to provide an aggregate of suitable size consist for production of electrodes.

2. A method of producing a carbon paste for self-baking electrodes which comprises hot mixing the carbon aggregate prepared by the method of claim 1 with from about 20 to 35% by weight of a carbonizable binder at a temperature above the softening point of said binder.

3. A method of producing a carbon electrode which comprises mixing the aggregate prepared according to the method of claim 1 with a minor amount of carbonizable binder, forming the mixture into a green electrode, and baking said green electrode to a temperature of at least 900° C. to produce a dense, hard carbon electrode having a specific resistivity not greater than about 0.0039 ohm/in./in.$^2$ and an apparent density of not less than about 1.39 g./cc.

4. A method according to claim 1 in which the crushed and milled calcined bituminous coal coke is admixed with petroleum coke calcined to at least 1200° C. and having a particle size larger than that of said coal coke, the petroleum coke being present in an amount up to about 65% by weight of the mixture and having a low volatile matter content, a specific resistivity of not greater than 0.0018 ohm/in./in.$^2$ and a real density of at least 2 g./cc.

5. A composition of matter for use in the production of electrodes consisting of an intimate mixture of an aggregate of suitable size consist for electrodes containing a major portion of calcined bituminous coal coke having an ash content not greater than 2.5% by weight, a real density of at least about 1.90 g./cc., and a specific resistivity of not greater than about 0.0025 ohm/in./in.$^2$, a minor portion of calcined petroleum coke constituting the larger particle sizes of said aggregate, said calcined petroleum coke having a real density of at least about 2 g./cc., and a specific resistivity of not greater than about 0.0018 ohm/in./in.$^2$, and a carbonizable binder in an amount from about 15 to 35% by weight.

6. An electrode predominantly of amorphous carbon for use in the production of aluminum by fused salt electrolysis consisting of an aggregate of calcined bituminous coal coke having an ash content of not greater than about 2.5% by weight, a real density of at least about 1.9 g./cc., and a specific resistivity of not greater than about 0.0025 ohm/in./in.$^2$, and a carbonized binder dispersed throughout said aggregate, said electrode having a specific resistivity not greater than 0.0039 ohm/in./in.$^2$ and an apparent density of not less than 1.39 g./cc.

7. Composition of matter for use in the production of electrodes consisting of an intimate mixture of an aggregate of suitable size consist for electrodes containing calcined bituminous coal coke having an ash content of not greater than about 2.5% by weight, a real density of at least about 1.90 g./cc., and a specific resistivity of not greater than about 0.0025 ohm/in./in.$^2$, and a carbonizable binder in an amount of from about 15 to 35% by weight.

References Cited in the file of this patent

UNITED STATES PATENTS

| | | |
|---|---|---|
| 538,289 | Shrewsbury et al. | Apr. 30, 1895 |
| 1,170,313 | Nagelschmitz | Feb. 1, 1916 |
| 1,317,497 | Hinckley | Sept. 30, 1919 |
| 1,317,498 | Hinckley | Sept. 30, 1919 |
| 1,489,830 | Illingworth | Apr. 8, 1924 |
| 1,517,819 | Beer | Dec. 2, 1924 |
| 1,570,103 | Trent | Jan. 19, 1926 |
| 1,824,326 | Broadbridge et al. | Sept. 22, 1931 |
| 2,148,133 | Reuscher et al. | Feb. 21, 1939 |
| 2,527,595 | Swallen | Oct. 31, 1950 |
| 2,582,764 | Bailey | Jan. 15, 1952 |
| 2,624,698 | Hickey | Jan. 6, 1953 |
| 2,653,878 | Sejersted | Sept. 29, 1953 |
| 2,657,118 | Phillips | Oct. 27, 1953 |

OTHER REFERENCES

Mantell: Industrial Electrochemistry, 1st ed. (1931), pages 481 to 483.

Fiat Report No. 838; P.B. 44659, "Elemental Fluorine," pages 11, 12, and 13.

"The Chemistry of Coal Utilization," vol. I (1945), pages 834 to 839 and 847.